Aug. 8, 1933.　　　C. T. CARLSON　　　1,921,806

HEAT EXCHANGE APPARATUS

Filed Oct. 18, 1932　　　3 Sheets-Sheet 1

Inventor
Carl T. Carlson
By
Attorney

Aug. 8, 1933.  C. T. CARLSON  1,921,806
HEAT EXCHANGE APPARATUS
Filed Oct. 18, 1932      3 Sheets-Sheet 2
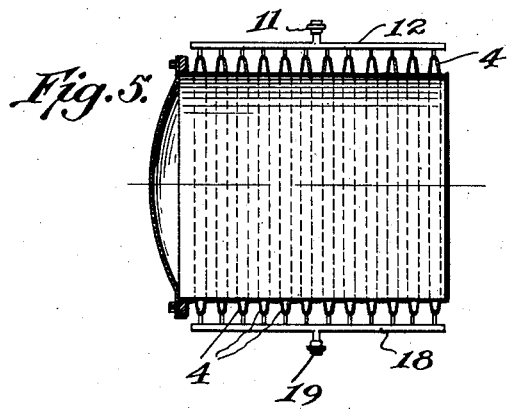
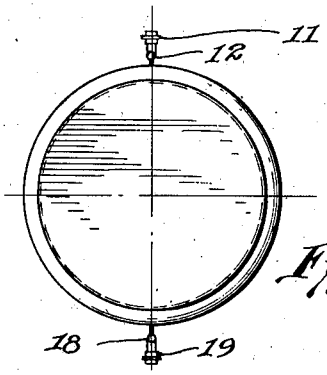
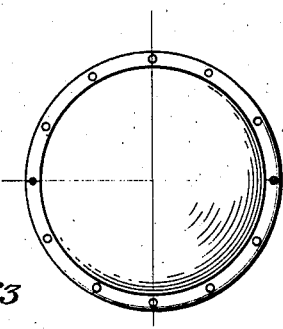
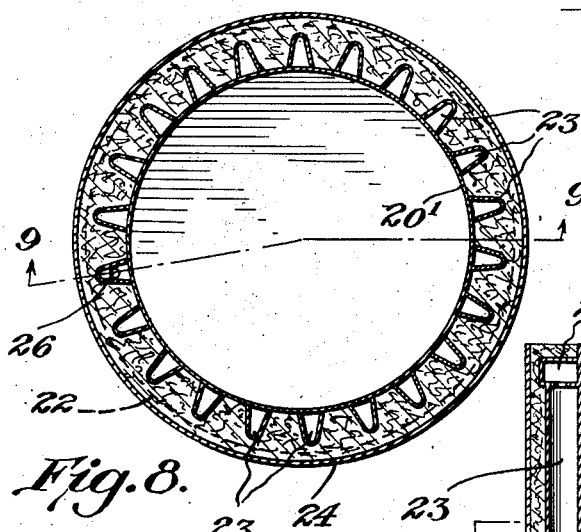
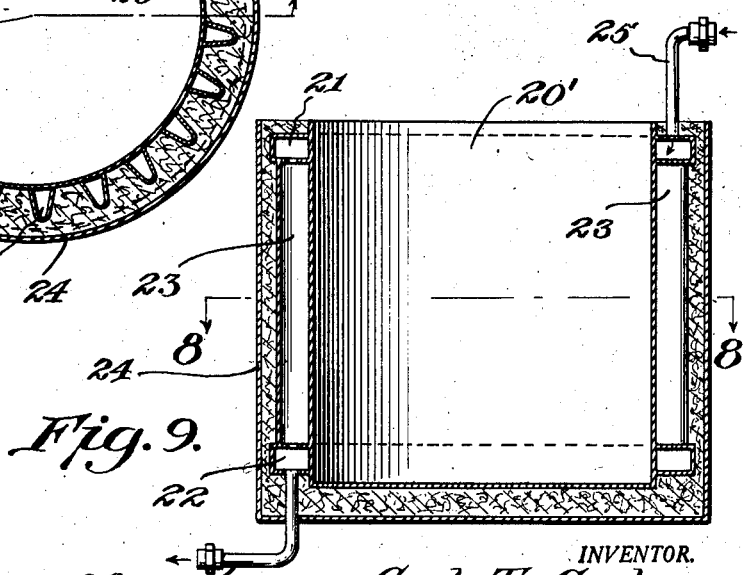
INVENTOR.
Carl T. Carlson
BY
ATTORNEYS.

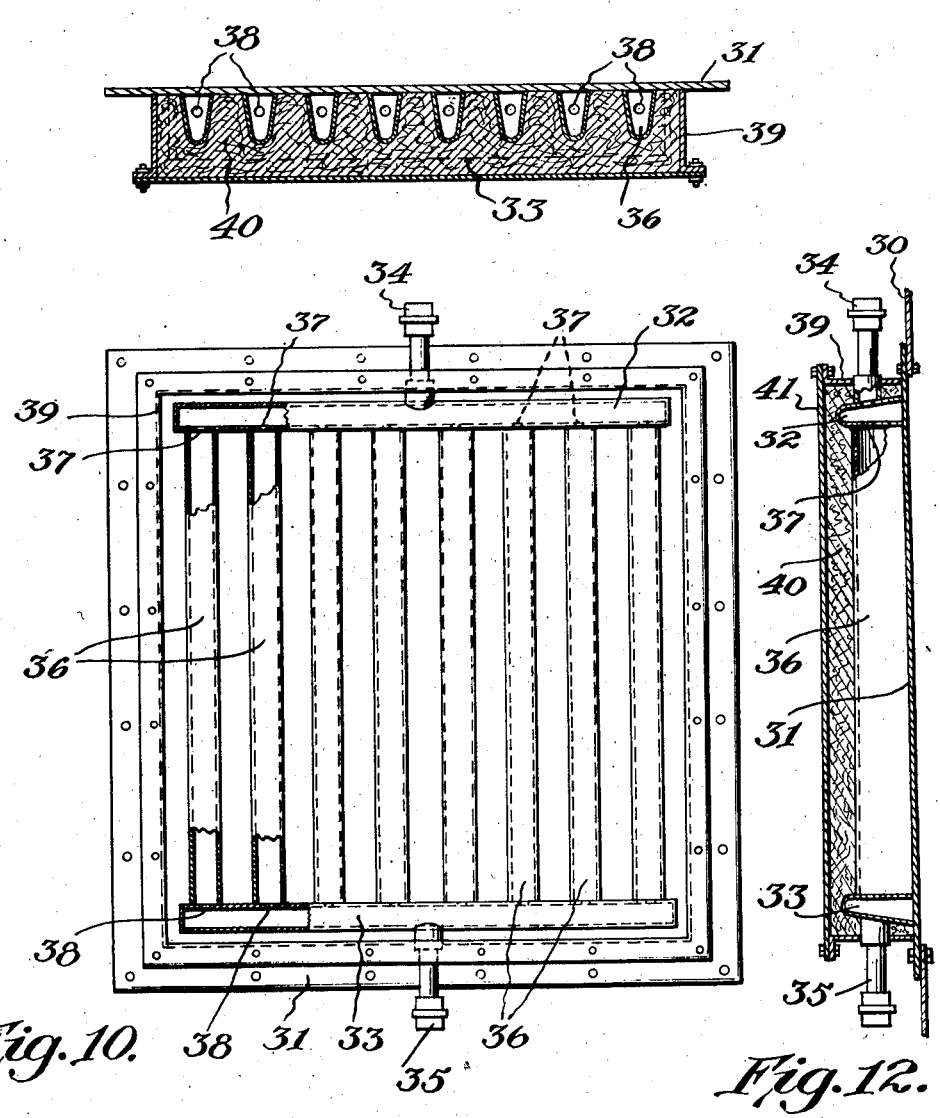

Patented Aug. 8, 1933

1,921,806

UNITED STATES PATENT OFFICE 1,921,806

HEAT EXCHANGE APPARATUS

Carl T. Carlson, Erie, Pa.

Application October 18, 1932. Serial No. 638,396

4 Claims. (Cl. 257—208)

This invention relates to a heat exchange apparatus of the tank type, such as a tank or container, either open or closed, and provided with a jacket having the heat exchanging elements, which in the present instance consist of tubes or conduits of special construction.

The object of the invention is to produce such a steam jacketed tank or container which will withstand pressure within the same, and also a pressure within the steam jacket, and which may be built from comparatively thin material, making it economically possible to fabricate such a container or tank from higher priced and purer material, such as rust free or stainless steel, copper, nickel plate, or any of the higher priced materials.

The invention is capable of being produced in various forms, some of which are illustrated in the accompanying drawings. It is capable of being used in sterilizers, cookers, and various other forms of heaters. Or it may be used for cooling purposes, as in milk coolers, refrigerating apparatus, and the like.

Figure 4:
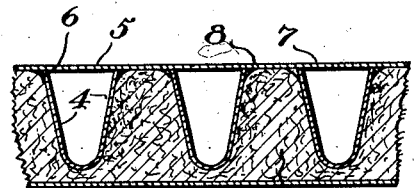
Figure 1:
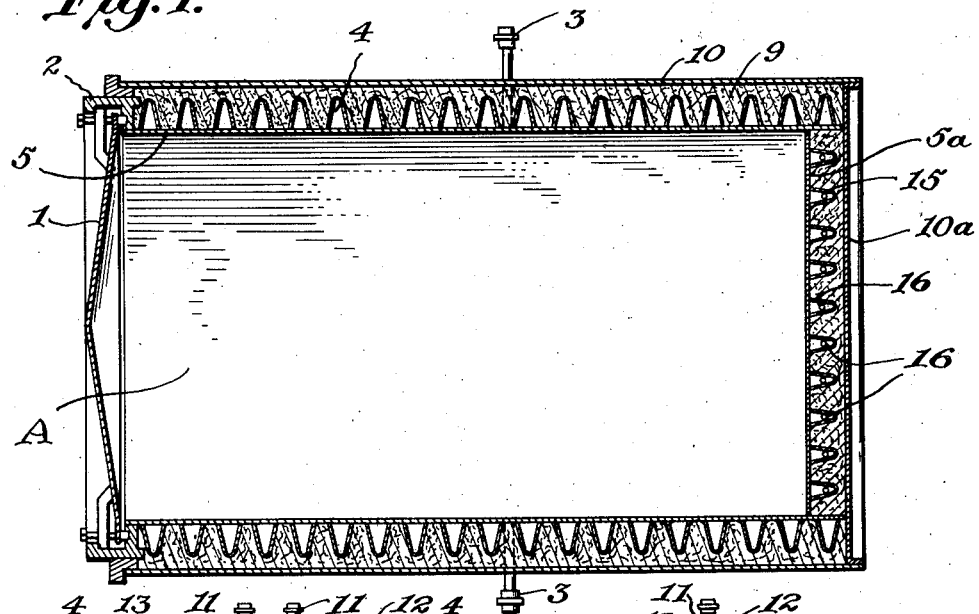
Figures 2, 3:
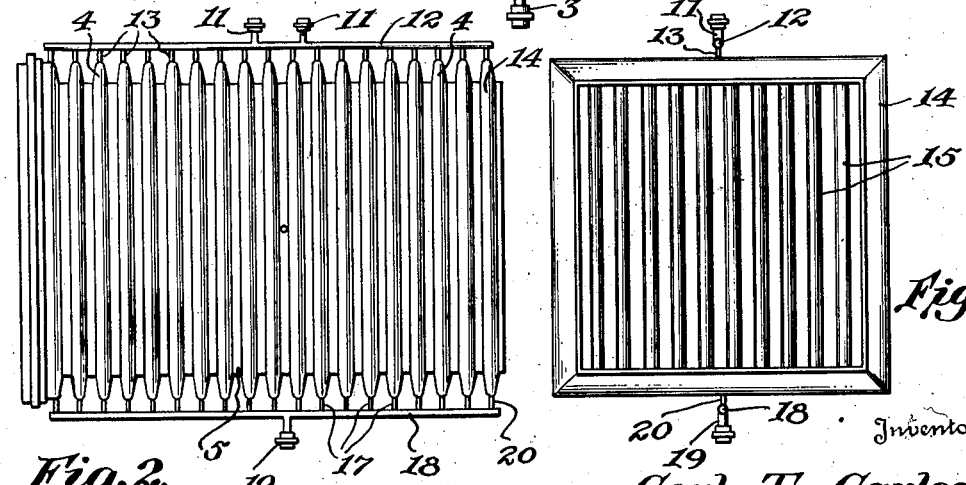

In the accompanying drawings Fig. 1 is a longitudinal section of a form adapted for a sterilizer. Fig. 2 is a side elevation thereof and Fig. 3 is an end elevation thereof with parts removed. Fig. 4 is a detail in section showing the wall and jacket construction. Fig. 5 is a sectional view of a modified form and Figs. 6 and 7 are end views thereof. Fig. 8 is a horizontal section on the line 8—8 of Fig. 9, of another modification, and Fig. 9 is a vertical section on the line 9—9 of Fig. 8. Fig. 10 is an end elevation of another form showing a heat exchange element which may be bolted onto the wall of the tank. Fig. 11 is a horizontal section of Fig. 10, and Fig. 12 is a vertical section thereof.

The container shown in Figs. 1, 2 and 3 may for example represent a sterilizer into the interior chamber A of which may be enclosed the articles to be sterilized. The door 1 is bolted or jammed by any suitable fastening devices, steam tight against the frame 2, and steam is injected into the inner chamber through one or more inlets 3 at a required pressure. In order to prevent condensation it is necessary in this form to heat the container with steam of higher pressure and temperature than that contained in the chamber A. This has heretofore been done by using double shells, forming a continuous steam jacket around the inside shell. This old construction, however, requires the two shells to be tied together by stay bolts which makes it necessary to use rather heavy platings, consequently making it economically impossible to use expensive materials. By means of the present invention, I form a steam jacket around the inner shell 5 by a number of thin plate strips bent to a substantially U-shape as indicated at 4. These are bent lengthwise, and the edges thereof are welded to the inner shell 5 along lines indicated at 6, each strip thus forming a small individual steam jacket or channel around the full circumference of the container. These individual steam jackets or conduits are preferably placed at a suitable distance from each other, and part of the heat of the steam contained therein will be exchanged directly through the space marked 7 of the inner wall 5, between the edges of the conduit. Part also of the heat will be conducted to the portions of the shell marked 8, between adjacent conduits; and thus the heat will be delivered or conducted to the interior of the container. The conduits or channels will preferably be covered or enclosed by insulation 9, of any suitable material, held in place by an outer shell or thin plating 10.

By using numerous small individual steam jackets or conduits they will withstand a high pressure, even when made from very thin material, and by making them of sufficient height, and placing them sufficiently close together, they serve as beams or reinforcements, spanning from one corner to another of the container, thus reinforcing the thin inside shell, sufficient to withstand an internal pressure in the container, which it may be desirable to make from thin high grade material. The welding of the conduit strips to the inner wall permits a strong and rigid container to be made of relatively thin material.

In the form shown in Fig. 1 the end wall, that is the wall opposite the door 1, is formed by welding straight U-strips or conduits indicated at 15 between the plates, the inner wall being indicated at 5a and the outer covering at 10a.

The steam supply for the various conduits enters a connection 11 and supplies a header pipe 12 which has a separate nipple connection 13 to each of the individual conduits, as shown in Fig. 2. The end conduit 14 supplies steam to the end wall conduits 15 through holes 16 drilled in one of the plates 5. The condensation from the various conduits or jackets is carried away through individual nipples 17 to a header 18 and outlet 19, and the condensation from the vertical end conduits 15 is carried away by holes through the bottom sheet, opposite to the holes 16, into the bottom portion of the conduit 14 and through a nipple 20 to the header 18. It will be understood that Figs. 2 and 3 show the device with the insulation 9 and outer shell 10 removed, so as to disclose the form and construction of the inner wall 5 and the conduits 4 around the same.

The above description is intended only for the purpose of illustrating one form of the invention, or one form of a heat exchanger to which it may be practically applied, and the invention may be used for the purpose of steam jacketing any kind of a container.

For example the container shown in Figs. 5, 6 and 7 is a horizontal round tank, with the conduits or welded channels 4 extending around the same, and with the suitable inlet and outlet connections. This form is obvious and requires no extended description. Of course the container can be any shape desired.

In Figs. 8 and 9 a form of vertical tank 20' is shown, around the top and bottom of which are welded hollow rings 21 and 22, forming top and bottom headers for the U-bends or channels 23 which communicate with the headers and extend vertically around the tank to which their edges are welded, the whole being enclosed if desired by an outlet casing 24. A steam inlet indicated at 25 and a drain outlet at 26 communicate with the top and bottom headers respectively.

Figs. 10, 11 and 12 show another embodiment by which the invention can be applied to any tank or container in a more general way. These figures show a steam heated element which may be bolted onto any tank or container containing a fluid or articles which it is desired to heat.

In this form, 30 indicates the side plate of a fluid tank or the like which it is desired to heat, and this has an opening over which the inner plate 31 is bolted. On the outside of plate 31 is welded an upper U-channeled header 32 and a lower similar header 33. These horizontal headers have their ends closed and the upper header 32 is provided with a steam inlet 34 and the lower header is provided with a condensation drain 35. Extending between these headers 32 and 33 are a number of vertical U-channels 36 the edges of which are welded to the plate 31 and the interior of which communicates through holes 37 with the header 32 and through holes 38 with the header 33. This enables steam to circulate through the headers and the vertical conduits from the inlet to the outlet.

The advantage of a heating element of this kind which can be bolted to any tank or container for heating the interior thereof is very great. Such heating is often done by means of pipe coils, but pipe coils are cumbersome and hard to keep clean, especially when submerged in chemical solutions, whereas the flat plate 31 is easily accessible and kept clean, and can also be made of purer and more expensive material, which will more readily withstand chemical action.

This heater may be enclosed by a frame 39 filled with insulation 40 and covered with an outer plate 41 bolted on the frame.

The shape of this heating element is immaterial and it also may be made in a variety of forms embodying a heating element applied to a plate which may be bolted over an opening in any tank or container containing fluid, so that it will contact with the fluid in the tank to produce a desired heat exchange.

All of the forms shown and described embody the idea of strips or channels U-shaped in cross section with their edges welded to the surface of a plate and thereby forming a steam jacket, one advantage of which is increased strength of bending resistance, since the channels reinforce the plate, and thin material may be used; and another advantage of which is an increase of heat transfer partly by means of direct conduction through the plate from the steam in the conduits, and partly by conduction of heat through the U-bend portion of the conduit into those portions of the plate not covered by the bends.

No limitation is implied by reason of the particular forms shown, but the invention may be embodied in various other shapes and arrangements.

I claim:

1. The combination with a sheet metal tank, of a jacket comprising a series of parallel channels welded at their edges to the wall of the tank, and headers communicating with the ends of the channels, said headers being provided with inlet and outlet connections.

2. The combination with a container having a relatively thin metal wall, of a jacket comprising a series of relatively small and closely spaced channels of relatively thin metal welded at their longitudinal edges to a wall of the tank and forming a series of conduits a part of the surface of which consists of said wall, and means to flow fluid through said conduits.

3. The combination with a tank having an opening in the wall thereof, of a heating element comprising a plate fitting over said opening and a hollow heating jacket on the outer side of said plate, said jacket consisting of a series of strips bent to substantially U-shape in cross section and welded at their longitudinal edges to the plate.

4. In a heat exchange apparatus, the combination with a sheet metal tank, of a jacket comprising a series of relatively small and closely spaced channel strips extending around the tank, the side edges of the strips being welded to the wall of the tank and thereby forming conduits and channel shaped reinforcements encircling the tank, and means to flow fluid through said conduits.

CARL T. CARLSON.